US011746021B2

United States Patent
Stevens, III (10) Patent No.: US 11,746,021 B2
(45) Date of Patent: Sep. 5, 2023

(54) HIGH PURITY ALUMINUM OXIDE VIA ELECTRODIALYSIS

(71) Applicant: NextChem, LLC, West Point, MS (US)

(72) Inventor: Joseph J. Stevens, III, West Point, MS (US)

(73) Assignee: NextChem, LLC, West Point, MS (US)

( * ) Notice: Subject to any disclaimer, the term of this patent is extended or adjusted under 35 U.S.C. 154(b) by 580 days.

(21) Appl. No.: 16/850,261

(22) Filed: Apr. 16, 2020

(65) Prior Publication Data

US 2020/0331769 A1 Oct. 22, 2020

Related U.S. Application Data

(60) Provisional application No. 62/835,585, filed on Apr. 18, 2019.

(51) Int. Cl.
*C01F 7/306* (2022.01)
*C01F 7/62* (2006.01)
*B01D 61/42* (2006.01)

(52) U.S. Cl.
CPC ............ *C01F 7/306* (2013.01); *B01D 61/422* (2013.01); *C01F 7/62* (2013.01); *B01D 2257/60* (2013.01)

(58) Field of Classification Search
CPC .. C01F 7/306; C01F 7/62; C01F 7/308; C01F 7/32; C01F 7/74; C01F 7/748; C01F 7/00–788; C01F 7/57; B01D 61/422; B01D 2257/60; C01P 2006/80
See application file for complete search history.

(56) References Cited

U.S. PATENT DOCUMENTS

| 3,673,068 A | * | 6/1972 | Seko | B01D 61/44 204/531 |
|---|---|---|---|---|
| 3,767,549 A | | 10/1973 | Sasaki et al. | |
| 4,203,812 A | | 5/1980 | Bergner et al. | |
| 4,222,989 A | | 9/1980 | Belsky et al. | |
| 4,224,287 A | | 9/1980 | Ziegenbalg et al. | |
| 4,237,102 A | | 12/1980 | Cohen et al. | |
| 4,239,735 A | | 12/1980 | Eisele et al. | |
| 4,465,566 A | | 8/1984 | Loutfy et al. | |
| 4,486,402 A | * | 12/1984 | Gurtner | C01F 7/306 423/626 |

(Continued)

FOREIGN PATENT DOCUMENTS

| CN | 105540632 A | * | 5/2016 | |
|---|---|---|---|---|
| CN | 108975370 A | | 12/2018 | |
| JP | S55156506 A | * | 12/1980 | |
| RU | 2373152 C2 | * | 11/2009 | ............. C01B 33/12 |
| WO | 2014094155 A1 | | 6/2014 | |

OTHER PUBLICATIONS

Zhuang et al., "Zero discharge process for foil industry waste acid reclamation: Coupling of diffusion dialysis and electrodialysis with bipolar membranes," Journal of Membrane Science 432 (2013) 90-96. (Year: 2013).*

(Continued)

*Primary Examiner* — Colin W. Slifka
*Assistant Examiner* — Logan Edward Laclair
(74) *Attorney, Agent, or Firm* — Barnes & Thornburg LLP; Scott D. Rothenberger (57) ABSTRACT

The invention describes methods for the production of a high purity aluminum salt solution via electrodialysis, and ultimately, the conversion of the high purity aluminum salt to high purity aluminum oxide.

20 Claims, 2 Drawing Sheets

(56) References Cited

U.S. PATENT DOCUMENTS

| | | | |
|---|---|---|---|
| 4,634,581 | A | 1/1987 | Cambridge et al. |
| 6,153,157 | A | 11/2000 | McLaughlin |
| 7,037,481 | B2 | 5/2006 | Becenel, Jr. |
| 7,837,961 | B2 | 11/2010 | Boudreault et al. |
| 7,846,318 | B2 | 12/2010 | Pratt et al. |
| 8,241,594 | B2 | 8/2012 | Boudreault et al. |
| 8,801,909 | B2 | 8/2014 | Pratt et al. |
| 9,517,944 | B2 | 12/2016 | Senyuta et al. |
| 9,631,255 | B2 | 4/2017 | Senyuta et al. |
| 9,687,813 | B2 | 6/2017 | Saleh |
| 10,023,472 | B2 | 7/2018 | Senyuta et al. |
| 10,081,553 | B2 | 9/2018 | Nichol et al. |
| 2007/0187256 | A1 | 8/2007 | Pratt et al. |
| 2007/0196302 | A1 | 8/2007 | Pratt et al. |

OTHER PUBLICATIONS

Notification Concerning Transmittal of International Preliminary Report on Patentability and International Preliminary Report on Patentability, dated Oct. 28, 2021, for PCT Application No. PCT/US2020/28634.

Bauer, et al., "A Strong Acid-Weak Acid Method for Producing Aluminum Chloride Hexahydrate From Kaolinitic Clay", Bureau of Mines Report Investigations/1984, Report of Investigations 8908, pp. 1-12.

Clark, et al., "Crystallization of Aluminum Chloride in the Hydrochloric Acid Process for Production of Alumina from Clay", Journal of Researchof the National Bureau of Standards, vol. 47, 4, Oct. 1991, Research Paper 2253, pp. 269-271.

Solcova, "Thermal Decomposition of Aluminum Chloride Hexahydrate", Industrial & Engineering Chemistry Research, Jul. 2005, pp. 6590-6598.

"Aluminum Chloride Solubility", 911 Metallurgist (2017), https://www.911metallurgist.com/aluminum-chloride-solubility/.

International Search Report and Written Opinion, dated Aug. 6, 2020, for PCT Application No. PCT/US2020/28634.

Office Action issued by the Chinese Patent Office in 202080041939.6, dated Feb. 13, 2023.

Extended Search Report issued by the European Patent Office, application No. 20790531.6, dated Mar. 29, 2023.

\* cited by examiner

HIGH PURITY ALUMINUM OXIDE VIA ELECTRODIALYSIS

CROSS REFERENCE TO RELATED APPLICATIONS

This application claims the benefit of U.S. Provisional Application Ser. No. 62/835585, filed Apr. 18, 2019 and entitled HIGH PURITY ALUMINUM OXIDE VIA ELECTRODIALYSIS, the entire contents of which are hereby incorporated by reference.

FIELD OF THE INVENTION

The invention relates generally to methods for the production of a high purity aluminum salt solution via electrodialysis, and ultimately, high purity aluminum oxide.

BACKGROUND OF THE INVENTION

It is desired that high purity aluminas have purities above 99.9% $Al_2O_3$. Applications with high purity aluminum oxide are quite numerous. For example, high purity aluminas are used in the area of ceramic processes, the preparation of translucent aluminas, in luminescent compositions for fluorescent lights, in bioceramics, in LED lighting products, separators for lithium ion batteries and for metal polishing. In addition, they comprise a primary material for the preparation of single crystals according to the Verneuil crystallization technique.

Different processes can be used to obtain aluminas of high purity. Some of the processes utilize aluminum as the starting material. In such cases, the aluminum is converted to the salt of an organic acid or to an alcoholate which is then hydrolyzed or thermally decomposed to obtain finally the alumina. Despite the possibility of recycling the alcohol in certain cases, the cost of this alumina is very high cost because of the necessity to employ metallic aluminum.

Some of the other routes start from impure aluminum hydroxide products, large quantities of which are obtained in the aluminum industry starting from minerals. These consist of passing through an intermediate mineral salt the crystallization of which permits the elimination of the major portion of the impurities. The product thus obtained is thermally decomposed to form pure alumina. Some other procedures according to this principle are based on the crystallization of ammonium alum which is formed starting from aluminum hydroxide, sulfuric acid, and ammonia, but this method of operation with such salt presents numerous disadvantages.

Other approaches involve preparation and purification of aluminum oxide through a plethora of steps. For example U.S. Pat. Nos. 7,837,961 and 10,081,553 require multiple washes of material, isolation of intermediate product(s), leaching, concentrating of solutions, re-dissolution of the intermediate product(s), additional isolation of components, drying, milling and isolating of multiple components from various steps in the processes.

The requirement of multistep processing increases operating and capital costs associated with the desired high purity aluminum oxide as well as possible contamination with undesired ions during processing.

Additionally, materials used in current processes, such as high purity water and high purity anion(s), high purity HCl, high purity aluminum metal, or high purity 1-hexanol must be used so that impurities are not introduced to the product. (See U.S. Pat. No. 10,081,553). The requirement to use high purity materials all add to the costs to prepare the high purity aluminum oxide.

Therefore, a need exists that overcomes one or more of the current disadvantages noted above.

BRIEF SUMMARY OF THE INVENTION

The present invention surprisingly provides a very straight forward, elegant, cost saving approach to prepare high purity alumina (HPA) without the need for expensive aluminum metal or complicated processes. The invention relates generally to methods for the production of a high purity aluminum salt solution, and, ultimately, high purity aluminum oxide.

The methods described herein entail providing an aluminum salt in an initial aqueous aluminum salt solution followed by subjecting the initial aqueous aluminum salt solution to electrodialysis conditions, with cation permeable and anion permeable membranes or bipolar membranes, to remove monovalent and/or multivalent cations from the initial aqueous aluminum salt solution.

A purified aqueous aluminum salt solution is produced with a reduction or complete removal of unwanted monovalent and/or multivalent non-aluminum cations from the initial aqueous aluminum salt solution.

The resultant purified aqueous aluminum salt solution contains a lower level of monovalent and multivalent non-aluminum cations than the initial aluminum-salt solution contains, e.g., less than 1000 ppm to about 1 ppm or less, e.g., 900 ppm, 800 ppm, 700 ppm, 600 ppm, 500 ppm, 400 ppm, 300 ppm, 200 ppm 100 ppm, 50 ppm, 25 ppm, 10 ppm, 5 ppm, 1 ppm, 0.5 ppm, 0.2 ppm, 0.1 ppm, 0.05 ppm, 0.02 ppm, 0.01 ppm, 0.001 ppm on an aluminum oxide basis, in total, of Na, K, Li, Ca, Cr, Zn, Cu, Ti, Mg, Mn, Fe, Si, or other cations or mixtures thereof and provides a purified aluminum salt.

The resultant purified aqueous aluminum salt solution can be subjected to various processes to isolate the purified aluminum salt which can then be subjected to various methods to convert the purified aluminum salt to a high purity aluminum oxide. The resultant high purity aluminum oxide has a purity in the range of from about 3N (99.9% pure, with an impurity level of only 0.1% or 1000 ppm) to about 6N (99.9999% pure with an impurity level of only 0.0001%, or 1 ppm).

The present embodiments provide several advantages over the current processes known in the art.

Use of electrodialysis to prepare a high purity aqueous aluminum salt solution provides a low cost and efficient process to ultimately prepare high purity aluminum oxide.

Direct removal of impurities from aqueous aluminum salt solutions provides for process control.

The embodiments described herein provide the ability to remove unwanted impurities from aqueous aluminum salt solution in a single processing step, e.g., electrodialysis.

Impurities such as sodium and calcium removed from the aqueous aluminum salt solution by the electrodialysis process do not concentrate in the mother liquor during subsequent crystallization or evaporation processes. This allows the mother liquor to be recycled efficiently minimizing the purge requirements of the mother liquor.

The embodiments described herein provide for the use of lower purity, lower cost raw materials including aluminum, aluminum salt sources, water and anion sources.

Additionally, there is much lower capital costs associated with the embodiments described herein due to the nature of the overall electrodialysis process, and the requisite expensive equipment. Many current commercial processes require a plethora of processing steps to achieve suitable purity of aluminum oxide.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

DETAILED DESCRIPTION

In the specification and in the claims, the terms "including" and "comprising" are open-ended terms and should be interpreted to mean "including, but not limited to. . . . " These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

As used herein, the term "high-purity aluminum oxide" ($Al_2O_3$) refers to aluminum oxide having a purity of about 3N (99.9% pure, with an impurity level of only 0.1%, or 1000 ppm) or greater. In some examples, the term "high-purity aluminum oxide" refers to aluminum oxide having a purity in the range of from about 3N to about 6N (99.9999% pure with an impurity level of only 0.0001%, or 1 ppm).

Electrodialysis ("ED") is an electrochemical process in which ions are transported through ion permeable membranes from one solution to another under the influence of a potential gradient. The electrical charges on the ions allow them to be driven through the membranes fabricated from ion exchange polymers. Applying a voltage between two end electrodes generates the potential field required for ion transport across membranes to occur. Since the membranes used in electrodialysis have the ability to selectively transport ions having positive or negative charge and reject ions of the opposite charge, useful concentration, removal, or separation of electrolytes can be achieved by electrodialysis. Commercial applications of electrodialysis include: The removal of salt from brackish water to generate drinking water, the concentration of salt from seawater up to 20% salt content, as a first step toward salt manufacture, the reduction of minerals from whey to manufacture infant formula, and the reduction of salt from soy sauce.

The device used for electrodialysis processes is generally referred to as an electrodialysis stack. For electrodialysis, the essential elements of an electrodialysis stack are an anode, a cathode, cation permeable membranes and anion permeable membranes. For bipolar electrodialysis, the essential elements of an electrodialysis stack are an anode, a cathode, cation permeable or anion permeable membranes and bipolar membranes or, in the case of a three compartment bipolar electrodialysis stack, cation and anion permeable and bipolar membranes.

Figure 1:
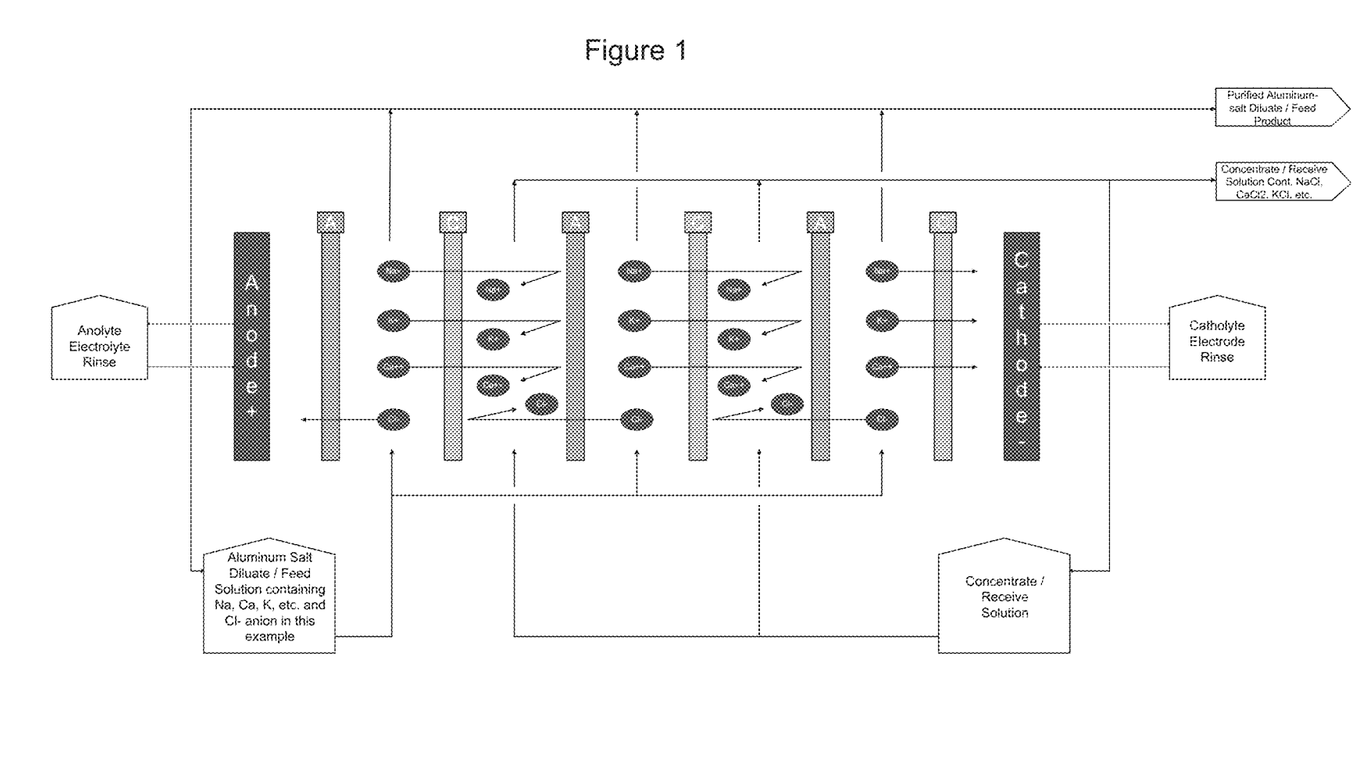
FIG. 1 is a depiction illustrating the basic components and operation of an electrodialysis process employing monolayer membranes.

FIG. 1 is a depiction illustrating the basic components and operation of an electrodialysis process employing monolayer membranes. Thus, the cation and anion permeable membranes are placed between the anode and the cathode in alternating fashion. Assembling the ion permeable membranes in this fashion creates two distinct sets of compartments. The first set of compartments or cells is comprised of an anion permeable membrane on the anode side and a cation ion permeable membrane on the cathode side. This set of cells is oriented with respect to the anode and the cathode so that ions are removed from these cells when a voltage is applied. The solutions in this set of compartments are referred to as the feed, diluate, or depleting stream. The second set of compartments or cells is comprised of an anion permeable membrane on the cathode side and a cation permeable membrane on the anode side. This set of cells is oriented with respect to the anode and the cathode so that ions are received and concentrated in these cells when a voltage is applied to the electrodes. The solutions in this second set of compartments are referred to as the receiving, concentrate or enriching stream. Thus, the net effect of the electrodialysis process is to transfer electrolytes from the feed solution to the receiving solution where said electrolytes are concentrated.

Figure 2:
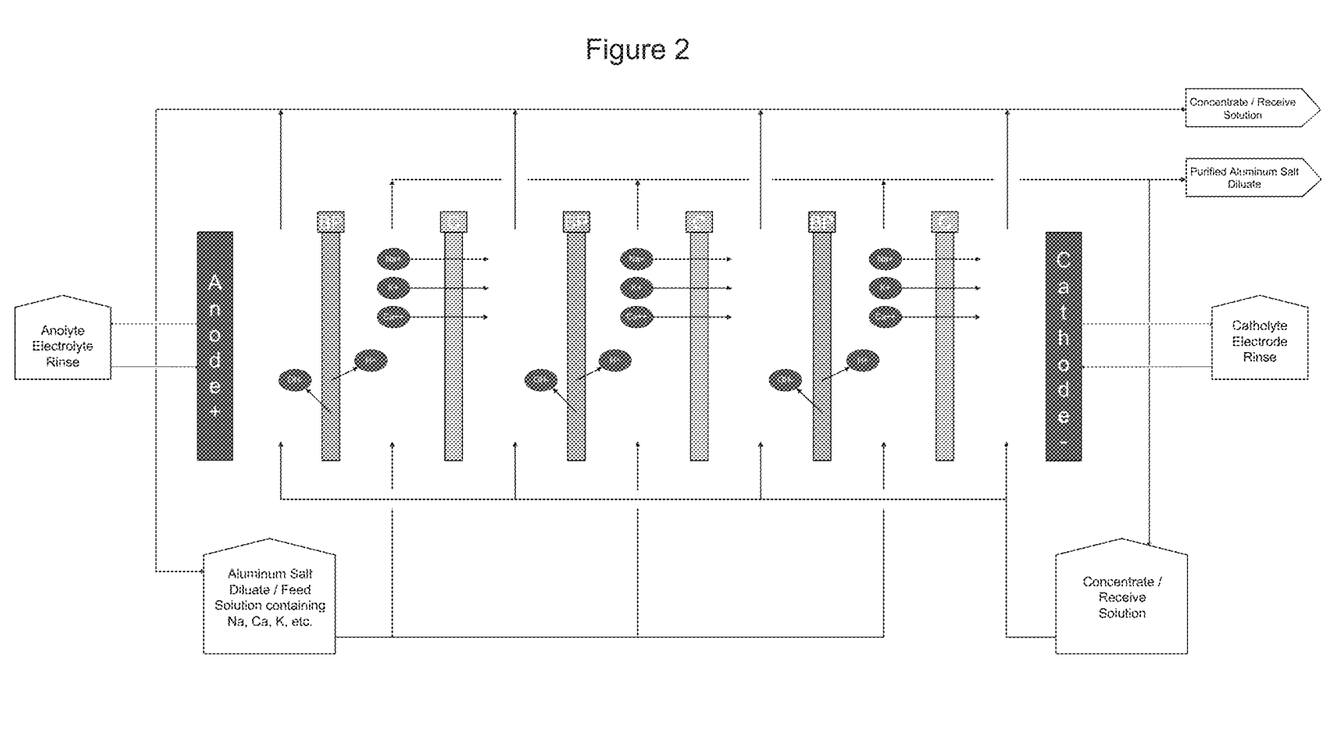
FIG. 2 is a depiction illustrating the basic components and operation of an electrodialysis process employing bipolar membranes in a two compartment configuration.

FIG. 2 is a depiction illustrating the basic components and operation of an electrodialysis process employing bipolar membranes in a two compartment configuration. Thus, bipolar and cation permeable membranes are placed between the anode and the cathode in alternating fashion. Assembling the bipolar and cation permeable membranes in this fashion creates two distinct sets of compartments. The first set of compartments or cells is comprised of a cation permeable membrane on the cathode side and a bipolar membrane on the anode side. The solution in this set of compartments is referred to as the feed, diluate or depleting stream. $H^+$ is provided by the bipolar membrane to the aluminum salt feed stream and unwanted cations are depleted from these cells when a voltage is applied. The second set of compartments or cells is comprised of a cation permeable membrane on the anode side and a bipolar membrane on the cathode side. This set of cells is oriented with respect to the anode and the cathode so that electrolytes are received and concentrated in these cells when a voltage is applied to the electrodes. The solutions in this second set of compartments are referred to as the receiving, concentrate or enriching stream. Thus, the net effect of the bipolar electrodialysis process is to transfer electrolytes from the feed solution to the receiving solution where said electrolytes are concentrated. A suitable acid, such as hydrochloric acid may be added to the receiving compartment to adjust the pH of the receiving solution in order to prevent precipitation of metal hydroxides such as $Ca(OH)_2$ and $Mg(OH)_2$.

FIGS. 1 and 2 are examples depicting the movement of cations Na+, Ca++, K+ and anion Cl− and are shown for illustrative purposes. Aluminum ion and other materials such as water or other molecules may be present as would be known by someone skilled in the art.

It should be understood that other configurations, such as a three compartment biopolar system, are possible and are within the scope of the embodiments described herein.

No specific current, voltage etc. is required and typical electrodialysis conditions of up to about 1.2 V per cell pair and 500 amp/$m^2$ current density are suitable for conventional electrodialysis and up to about 1.8 V per cell pair and 600 amp/m$^2$ for bipolar electrodialysis.

By treating the Al-salt solutions with either electrodialysis or bipolar electrodialysis, cations are selectively and efficiently removed from the Al-salt feed solution and transported to the receive solution. This is an advantage of the process in that unwanted cations are separated from the Al-salt solutions and efficiently removed from the system.

Materials of construction for components of the electrodialysis system such as electrodialysis stack components, tanks, pumps, valves, piping and instruments can comprise a non-contaminating material, coating or liner that can resist the chemical and operating conditions of the electrodialysis process without contaminating the process with additional impurities. Examples include but are not limited to PVDF, PTFE, CPVC, PVC, rubber, polypropylene, glass, vinyl ester resin and chemically compatible thermoplastic resins.

Impurities contained in aluminum salts can be efficiently and selectively removed from aluminum salt solutions using electrodialysis to levels equivalent to aluminum salts prepared from high purity metal, high purity acid and high purity water. Thus the embodiments described herein provide advantages where purity of water, acid and aluminum raw material is not necessarily required due to the unique characteristics of the electrodialysis process.

For Example, the Electrodialysis Process Includes:

providing a conventional electrodialysis stack with cation and anion membranes or providing a bipolar electrodialysis stack with bipolar and cation membranes. Exemplary membranes include a cation membrane such as Astom Neosepta CMB and an anion membrane such as Astom Neosepta AHA and Astom Bipolar membrane. Cation, anion, and bipolar membranes from other manufacturers may also be used.

The aluminum salt is placed in the feed tank and circulated through the feed compartments of the stack consisting of a cation membrane on the cathode side of the compartment and anion membrane on the anode side of the compartment or a bipolar membrane on the anode side of the compartment and a cation membrane on the cathode side of the compartment.

The receive solution can be water plus an electrolyte such as hydrochloric acid, a solution of the aluminum salt or other solutions suitable for electrodialysis. The receive solution is placed in the receive tank and circulated through the receive compartments of the stack consisting of an anion membrane on the cathode side of the compartment and cation membrane on the cathode side of the compartment or a bipolar membrane on the anode side of the compartment and a cation membrane on the cathode side of the compartment.

The solutions are circulated through the electrodialysis stack as conventionally done with electrodialysis processes and with application of suitable DC power. Electrode rinse solutions are provided and circulated through the electrode compartments as conventionally done with electrodialysis processes.

The solutions can be optionally filtered before, during or after the electrodialysis process.

The electrodialysis process can be conducted under any physical conditions such as temperature, pressure, etc. suitable for electrodialysis.

Cations, including but not limited to sodium, calcium, magnesium, lithium and potassium, are selectively and efficiently removed from the aluminum salt feed solution and transported to the receive solution.

The receive solution can be disposed of, recycled or further treated and purified by electrodialysis.

The aluminum contained in the aluminum salt product substantially remains in the product solution contained within the feed loop of the electrodialysis system.

Suitable aluminum salts include, but are not limited to aluminum chloride, aluminum sulfate, aluminum ammonium sulfate, aluminum nitrate, aluminum citrate, 1-hexanol aluminum, polyaluminum chloride (PAC), aluminum chlorohydrate (ACH), aluminum acetate, aluminum choline solution or mixtures thereof.

The [Al]:[ligand] ratio can vary. For example, aluminum salts such as AlCl$_3$, polyaluminum chloride, or Al$_2$(OH)$_5$Cl (aluminum chlorohydrate) as defined by the formula Al$_2$(OH)$_{6-x}$Cl$_x$, where x is any integer or fraction and the resulting molecular formula represents a soluble aluminum compound or any aluminum salt in solution with HCl may be used.

The aluminum salts can be obtained from sources, including but not limited to clays that contain aluminum, such as kaolin or bauxite, aluminum hydroxide, aluminum trihydrate (ATH), aluminum metal or mixtures thereof.

These aluminum sources contain impurities including monovalent and multivalent cations such as Na, K, Li, Ca, Mg, Mn, Fe, Si, etc.

The electrodialysis processes described herein provide an advantage in that high purity aluminum metal or other aluminum source is not required as a starting material to prepare aluminum salts for the processes herein. This results in a substantial cost savings and also provides the ability to use alternative based aluminum source materials other than high purity aluminum metal.

The electrodialysis process is efficient at removing contaminants, such as monovalent and multivalent cations, from the aluminum salt solution. Examples of monovalent and multivalent cations that can be a source of contamination in the initial aluminum salt solution as final purified aluminum salt solution include, but are not limited to, Na, K, Li, Ca, Cr, Zn, Cu, Ti, Mg, Mn, Ba, Sr, V, Ni, Pb, Co, Sb, As, B, Sn, Be, Mo, Fe, Si or mixtures thereof.

Generally, the aluminum salt solutions (receiving/enriching and depleting/feed streams) are aqueous based. That is, the solutions used in the electrodialysis process include water but can also include, for example, non-aqueous solvents such as 1-hexanol or other aluminum alkoxides and aqueous choline solutions (See, for example, U.S. Pat. No. 5,225,229). Due in part by the nature of the electrodialysis process, it is not required to use high purity water in the process. The non-requirement of purified water in the processes described herein results in substantial cost savings and reduced waste.

The electrodialysis processes described herein result in a purified aqueous aluminum salt solution that contains a lower level of monovalent and multivalent non-aluminum cations than the initial aluminum-salt solution contains, e.g., less than about 1000 ppm to about less than 1 ppm or even less on an aluminum oxide basis, in total, of one or more unwanted monovalent and/or multivalent cations.

After the purified aqueous aluminum salt solution is obtained, the solution can be subjected to various treatments to ultimately prepare high purity aluminum oxide of about 3N (99.9%) to 6N (99.9999%) or greater in purity.

In one aspect, the purified aqueous aluminum salt solution is subjected to a separation step to collect the purified aluminum salt. This can be accomplished by methods known in the art, such as crystallization, evaporation of the water from the solution, centrifugation, etc.

In another aspect, the purified aqueous aluminum salt solution is acidified with an acid, such as, hydrochloric acid, nitric acid, or sulfuric acid. The resultant precipitate can then be collected by methods known in the art.

The separation and isolation process can include, but is not limited to, settling, filtering, or centrifuging the aluminum salt crystals and mother liquor mixture. The separation can be performed in one or more non-contaminating separation vessels and handling equipment, which can comprise one of the non-contaminating materials described above with respect to the electrodialysis configuration.

The separated purified aluminum salt(s) can optionally be washed with a washing liquid to remove any impurities that may adhere to the aluminum salt crystals. In an example, the washing liquid can comprise at least one of a high-purity acid, such as HCl, concentrated hydrochloric acid, high-purity acetone or another high purity solvent, or a high-purity solution of the aluminum salt (e.g., if the crystals are aluminum chloride crystals, then an aluminum chloride solution can be used as the washing liquid), and high-purity water. In an example, an acid washing liquid (e.g., high-purity HCl, such as concentrated HCl) is used with a concentration that is sufficiently high so that a substantial portion of the purified aluminum salt materials do not dissolve back into solution. The washing of the purified aluminum salt materials can also be sufficiently rapid so that a substantial portion of the purified aluminum salt materials do not dissolve. The washing liquid can be purified and reused in the process. The aluminum salt product can optionally be milled, ground, or tumbled so that the resultant material can have a smaller size for later in the process.

The purified aluminum salt can be further treated. In one instance, the purified aqueous aluminum salt solution or crystal can be directly treated by a number of methods of heat treatment to remove water and anion and provide a highly purified aluminum oxide. In another method, the purified aluminum salt solution or crystal can be heated to convert to a highly purified aluminum oxide.

For example, the purified aqueous aluminum salt solution or crystal can be subjecting to calcining to provide the high purity aluminum oxide. Alternatively, the isolated purified aluminum salt crystal can be calcined directly. A fine mist of the purified aqueous aluminum salt solution is sprayed into a calcination furnace to remove the water and anion, to convert the highly purified aluminum salt to form highly purified aluminum oxide. The highly purified aluminum oxide can be collected in a non-contaminating container formed from one of the above-noted non-contaminating materials, e.g., Teflon.

In another embodiment, the purified aluminum salt solution can be spray roasted, a type of calcining, to convert the high purity aluminum salt solution to afford the high purity aluminum oxide.

Typically, the calcining step or spray roasting step is conducted over a temperature range of from about 300° C. to about 1800° C., more particularly from about 500° C. to about 1300° C., and more particularly from about 800° C. to about 1200° C. Generally, a temperature range of about 1000° C. to about 1300° C. will convert phases of alumina, such as gamma, theta, kappa or other phases of alumina, to desired alpha alumina.

Spray roasting or calcining decomposes the Al salt solution to separate HCl and water from the alumina which forms an intermediate alumina, e.g., gamma, theta, kappa or other phases. If desired the intermediate alumina can be further heated to form the desired crystalline phase such as alpha alumina.

Alternatively, spray drying of the aluminum salt solution to form a dry aluminum salt crystal followed by calcination of the dry aluminum salt can provide HPA.

In another embodiment, the purified aqueous aluminum solution can be subjected to an "oil drop" process to prepare the aluminum oxide. The solution is contacted with hot oil to cause the water and HCl to be removed and the purified aluminum salt to convert to aluminum oxide.

In all cases the ligand or acid that evolves from the decomposition of the aluminum salt during calcining can be captured and then reacted with an aluminum source such as alumina trihydrate, kaolin or aluminum metal to produce initial Al-salt for use in the process. For example, the hydrochloric acid and water that evolves from heating the aluminum salt solution or crystal is condensed to form a hydrochloric acid solution. This hydrochloric acid solution can be used to dissolve an aluminum source such as aluminum trihydrate, kaolin, aluminum metal and fully recycled.

The resultant high purity aluminum oxide can optionally be washed, or milled, ground, or tumbled so that the resultant material can have a smaller size for further processing.

The high purity aluminum oxide depicted herein has many applications. For example, high purity aluminum oxide or alumina powder can be used to make translucent tubes for high-pressure sodium lamps, sapphires for watch covers, high-strength ceramic tools, abrasives for magnetic tape, light emitting diodes as a substrate for GaN, silicon microchip wafers for optic-electronics, windows and cowls for aircrafts, protective windows for car headlamps, cell phones and other electronic devices, stop signals, surgery scalpels, micro-optical elements of medical fiber-optic probes, optical scanners for bar codes, ultraviolet CD and DVD optical systems, prisms, lenses, optical plates, optical systems of visual and IR diapasons, cell phone, mobile devices and fiber-optic system display windows, LED lighting, catalyst materials, insulation material for electrical applications such as lithium ion batteries, equipment for chemical manufacturing in aggressive and high-temperature environments: tubes, crucibles, funnels, chemical glassware, abrasives, battery components, bearings and jewelry stones. Impurities, such as monovalent and multivalent cations are detrimental to such materials.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

The following paragraphs enumerated consecutively from 1 through 50 provide for various aspects of the various embodiments described herein. In one embodiment, in a first paragraph (1), the present invention provides: 1. A method for the production of a high purity aqueous aluminum salt solution comprising the steps:

providing an aluminum salt in an initial aluminum salt solution;

subjecting the initial aqueous aluminum salt solution to electrodialysis to remove monovalent and multivalent cations from the initial aqueous aluminum salt solution, wherein a purified aqueous aluminum salt solution is produced with a reduction of unwanted monovalent and/or multivalent cations from the initial aqueous aluminum salt solution.

2. The method of paragraph 1, wherein the unwanted monovalent and/or multivalent cations are completely removed from the purified aqueous aluminum salt solution.

3. The method of paragraph 1, wherein the unwanted monovalent and/or multivalent cations of the initial aqueous aluminum salt solution comprise Na, K, Li, Ca, Cr, Zn, Cu, Ti, Mg, Mn, Ba, Sr, V, Ni, Pb, Co, Sb, As, B, Sn, Be, Mo, Fe, Si or other cations or mixtures thereof.

4. The method of any of paragraphs 1 through 3, wherein the aluminum salt of the initial aqueous aluminum salt solution comprises aluminum chloride, aluminum sulfate, aluminum ammonium sulfate, aluminum nitrate, aluminum citrate, 1-hexanol aluminum, polyaluminum chloride (PAC), aluminum chlorohydrate (ACH), aluminum acetate, aluminum choline solution or mixtures thereof.

5. The method of paragraph 4, wherein the aluminum salt is derived from a clay containing aluminum.

6. The method of paragraph 5, wherein the aluminum clay is kaolin or bauxite or other aluminous clay.

7. The method of paragraph 4, wherein the aluminum salt is derived from aluminum hydroxide, alumina trihydrate (ATH), or aluminum metal.

8. The method of any of paragraphs 1 through 7, wherein the purified aqueous aluminum salt solution contains a lower level of monovalent and multivalent non-aluminum cations than the initial aluminum-salt solution contains, on an aluminum oxide basis, in total, of unwanted monovalent and/or multivalent cations.

9. The method of any of paragraphs 1 through 7, wherein the purified aqueous aluminum salt solution comprises less than about 1000 ppm to about 1 ppm on an aluminum oxide basis, in total, of unwanted monovalent and/or multivalent cations.

10. The method of any of paragraphs 1 through 7, wherein the purified aqueous aluminum salt solution comprises less than about 100 ppm to about 1 ppm on an aluminum oxide basis, in total, of unwanted monovalent and/or multivalent cations.

11. The method of paragraph 10, wherein the purified aqueous aluminum salt solution comprises less than about 10 or less than about 1 ppm or even less on an aluminum oxide basis, in total, of unwanted monovalent and/or multivalent cations.

12. The method of any of paragraphs 1 through 11, further comprising the step:
crystallizing a purified aluminum salt from the purified aqueous aluminum salt solution.

13. The method of paragraph 12, wherein the purified aluminum salt is separated from the purified aqueous aluminum salt solution.

14. The method of any of paragraphs 1 through 11, further comprising the step:
evaporating the aqueous portion of the purified aqueous aluminum salt solution, wherein a purified aluminum salt is obtained.

15. The method of any of paragraphs 1 through 11, further comprising the step:
treating the purified aqueous aluminum salt solution with an acid, wherein a precipitate of purified aluminum salt is obtained.

16. The method of paragraph 15, wherein the acid is hydrochloric acid, nitric acid, sulfuric acid or mixtures thereof.

17. The method of any of paragraphs 12 through 16, wherein the purified aluminum salt is treated with a high purity aluminum salt solution or other solution, such as concentrated hydrochloric acid.

18. The method of any of paragraphs 12 through 16, wherein the purified aluminum salt is washed with a high purity aluminum salt solution.

19. The method of either paragraphs 17 or 18, wherein the purified aluminum salt is washed or treated with a high purity saturated aluminum salt solution.

20. The method of any of paragraphs 12 through 19, further comprising the step:
subjecting the purified aluminum salt to heating, roasting, calcining, spray roasting or an oil drop procedure or other heating process to provide a purified aluminum oxide.

21. The method of paragraph 20, wherein the purified aluminum oxide contains a lower level of monovalent and multivalent non-aluminum cations than the initial aluminum-salt solution contains, on an aluminum oxide basis, in total, of unwanted monovalent and/or multivalent cations.

22. The method of paragraph 20, wherein the purified aluminum oxide comprises less than about 1000 ppm to about 1 ppm on an aluminum oxide basis, in total, of one or more unwanted monovalent and/or multivalent cations.

23. The method of paragraph 20, wherein the purified aluminum oxide comprises less than about 100 ppm to about 1 ppm on an aluminum oxide basis, in total, of one or more unwanted monovalent and/or multivalent cations.

24. The method of paragraph 20, wherein the purified aluminum oxide comprises less than about 10 ppm or less than about 1 ppm or even less on an aluminum oxide basis, in total, of one or more unwanted monovalent and/or multivalent cations.

25. A method for the removal of monovalent and multivalent metal cations from an aqueous aluminum salt solution comprising the steps:
providing an aluminum salt in an initial aluminum salt solution;
subjecting the initial aqueous aluminum salt solution to electrodialysis to remove monovalent and multivalent cations from the initial aqueous aluminum salt solution, wherein a purified aqueous aluminum salt solution is produced with a reduction of unwanted monovalent and/or multivalent cations from the initial aqueous aluminum salt solution.

26. The method of paragraph 25, wherein the unwanted monovalent and/or multivalent cations are completely removed from the purified aqueous aluminum salt solution.

27. The method of paragraph 25, wherein the unwanted monovalent and/or multivalent cations of the initial aqueous aluminum salt solution comprise Na, K, Li, Ca, Cr, Zn, Cu, Ti, Mg, Mn, Ba, Sr, V, Ni, Pb, Co, Sb, As, B, Sn, Be, Mo, Fe, Si or other cations or mixtures thereof.

28. The method of any of paragraphs 25 through 27, wherein the aluminum salt of the initial aqueous aluminum salt solution comprises aluminum chloride, aluminum sulfate, aluminum ammonium sulfate aluminum nitrate, aluminum citrate, 1-hexanol aluminum, polyaluminum chloride (PAC), aluminum chlorohydrate (ACH), aluminum acetate, aluminum choline solution or mixtures thereof.

29. The method of paragraph 27, wherein the aluminum salt is derived from a clay containing aluminum.

30. The method of paragraph 29, wherein the aluminum clay is kaolin or bauxite or other aluminous clay.

31. The method of paragraph 28, wherein the aluminum salt is derived from aluminum hydroxide, alumina trihydrate (ATH), or aluminum metal.

32. The method of any of paragraphs 25 through 31, wherein the purified aqueous aluminum salt solution contains a lower level of monovalent and multivalent non-aluminum cations than the initial aluminum-salt solution contains, on an aluminum oxide basis, in total, of unwanted monovalent and/or multivalent cations.

33. The method of any of paragraphs 25 through 31, wherein the purified aqueous aluminum salt solution comprises less than about 1000 ppm to about 1 ppm on an aluminum oxide basis, in total, of unwanted monovalent and/or multivalent cations.

34. The method of any of paragraphs 25 through 31, wherein the purified aqueous aluminum salt solution comprises less than about 100 ppm to about 1 ppm on an aluminum oxide basis, in total, of unwanted monovalent and/or multivalent cations.

35. The method of paragraph 34, wherein the purified aqueous aluminum salt solution comprises less than about 10 or less than about 1 ppm or even less on an aluminum oxide basis, in total, of unwanted monovalent and/or multivalent cations.

36. The method of any of paragraphs 25 through 35, further comprising the step:
crystallizing a purified aluminum salt from the purified aqueous aluminum salt solution.

37. The method of paragraph 36, wherein the purified aluminum salt is separated from the purified aqueous aluminum salt solution.

38. The method of any of paragraphs 25 through 35, further comprising the step:
evaporating the aqueous portion of the purified aqueous aluminum salt solution, wherein a purified aluminum salt is obtained.

39. The method of any of paragraphs 25 through 35, further comprising the step:
treating the purified aqueous aluminum salt solution with an acid, wherein a precipitate of purified aluminum salt is obtained.

40. The method of paragraph 39, wherein the acid is hydrochloric acid, nitric acid, sulfuric acid or mixtures thereof.

41. The method of any of paragraphs 36 through 40, wherein the purified aluminum salt is treated with a high purity aluminum salt solution or other solution, such as concentrated hydrochloric acid.

42. The method of any of paragraphs 36 through 40, wherein the high purity aluminum salt is washed with a high purity aluminum salt solution.

43. The method of either paragraphs 41 or 42, wherein the purified aluminum salt is treated or washed with a saturated high purity aluminum salt solution.

44. The method of any of paragraphs 36 through 43, further comprising the step:
subjecting the purified aluminum salt to heating, roasting, calcining, spray roasting or an oil drop procedure or other heating process to provide a purified aluminum oxide.

45. The method of paragraph 44, wherein the purified aluminum oxide contains a lower level of monovalent and multivalent non-aluminum cations than the initial aluminum-salt solution contains, on an aluminum oxide basis, in total, of unwanted monovalent and/or multivalent cations.

46. The method of paragraph 44, wherein the purified aluminum oxide comprises less than about 1000 ppm to about 1 ppm on an aluminum oxide basis, in total, of one or more unwanted monovalent and/or multivalent cations.

47. The method of paragraph 44, wherein the purified aluminum oxide comprises less than about 100 ppm to about 1 ppm on an aluminum oxide basis, in total, of one or more unwanted monovalent and/or multivalent cations.

48. The method of paragraph 44, wherein the purified aluminum oxide comprises less than about 10 ppm or less than about 1 ppm or even less on an aluminum oxide basis, in total, of one or more unwanted monovalent and/or multivalent cations.

49. A high purity alumina (HPA) provided by any of the processes of paragraphs through 48.

50. The high purity aluminum of paragraph 49, wherein the HPA is used in high-pressure sodium lamps, sapphires for watch covers, high-strength ceramic tools, abrasives for magnetic tape, light emitting diodes as a substrate for GaN, silicon microchip wafers for optic-electronics, windows and cowls for aircrafts, protective windows for car headlamps, cell phones and other electronic devices, stop signals, surgery scalpels, micro-optical elements of medical fiber-optic probes, optical scanners for bar codes, ultraviolet CD and DVD optical systems, prisms, lenses, optical plates, optical systems of visual and IR diapasons, cell phones, cell phone display windows, mobile devices and fiber-optic system display windows, LED lighting, catalyst materials, insulation material for electrical applications such as lithium ion batteries, equipment for chemical manufacturing in aggressive and high-temperature environments: tubes, crucibles, funnels, chemical glassware, abrasives, battery components, bearings and jewelry stones.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

EXAMPLES

Example 1

Production of High Purity Aluminum Chloride Hexahydrate Crystals via Electrodialysis Electrodialysis stack and system: Euro 2 electrodialysis stack provided by Eurodia Industrie with 10 cell pairs configured as described in FIG. 1 herein with Astom Neosepta CMB cation membranes and Astom Neosepta AHA anion membranes. The anolyte solution was dilute sulfuric acid and the catholyte solution was dilute hydrochloric acid. These solutions are circulated through the compartments that contain the electrodes and in these examples are separated from the active cells of the ED stack by a membrane.

Feed solution: 3000 grams of polyaluminum chloride solution produced from alumina trihydrate, hydrochloric acid and water with the analysis reported on an aluminum oxide basis as Solution 1 in Table 1 below.

Receive solution: 7900 grams of deionized water adjusted to pH 2.5 with HCl.

The above feed and receive solutions were placed into the feed and receiving tanks of the Euro 2 system. The circulations pumps were started to circulate the solutions through the Euro 2 ED stack and back to the respective tanks. The temperature of the feed and receive solutions was maintained at 40 degrees C. The DC power supply was started at 17 V and current was applied at a maximum of 9 amps. A total of 11.97 amp hours charge was passed.

The DC power was stopped, the circulation pumps were stopped, and the solutions were removed from the tanks.

The purified feed solution resulting from the above electrodialysis operation was analyzed and the analysis is reported on an aluminum oxide basis as Solution 2 in Table 1.

15.5 grams of concentrated HCl was added to 54.5 grams of the purified diluate solution while stirring to form aluminum chloride hexahydrate (ACH) crystals in mother liquor.

The ACH crystals were separated from the mother liquor by filtration on a Buchner funnel with filter paper and then washed with 100 milliliters of concentrated HCl. 17.7 grams of ACH crystals were collected, analyzed and the analysis is reported on an aluminum oxide basis as Crystal 1 in Table 1.

The above described process may be operated in batch mode or in a continuous mode whereby Al-salt feed solution is continuously added to the system and continuously removed and the receive solution is continuously added and continuously removed. The system may be operated in semi-batch mode or any combination of batch and continuous modes.

All analysis described herein were performed by ICP-OES, also known as ICP-AES. Other suitable methods to determine impurities include, for example, glow discharge mass spectrometry (e.g., Thermo Scientific Element GD Plus BD-MS), and/or X-ray fluorescence spectroscopy.

Aluminum salt solutions, aluminum salt crystals or HPA were analyzed for trace elements using a Spectro ARCOS EOP (End on Plasma or Axial View) ICP-OES. The ICP-OES utilizes an OptiMist® VORTEX Nebulizer and Cyclonic Spray Chamber supplied by Texas Scientific Products as well as a D-Torch with a Quartz Outer Tube and a 2.4 mm Sapphire Injector supplied by Glass Expansion. HPA samples were digested in sulfuric acid, diluted in nitric acid and elemental analysis measured. The calibrations were performed using standard solutions of various mono or multivalent cations at known concentrations that were prepared under similar conditions. The aluminum source for the HPA standards was a 20 mg/mL standard (#SM-1934-001-1L) obtained from High Purity Standards.

Elements below detection limits are excluded.

TABLE 1

| PARAMETER | Solution 1 | Solution 2 | Crystal 1 | UNITS |
|---|---|---|---|---|
| Al2O3 | 8.02 | 8.02 | 19.89 | wt/wt % |
| Ca | 207 | 31 | 0.50 | ppm |
| Fe | 374 | 239 | 3.52 | ppm |
| Ga | 62 | 66 | 0.50 | ppm |

TABLE 1-continued

| PARAMETER | Solution 1 | Solution 2 | Crystal 1 | UNITS |
|---|---|---|---|---|
| K | 39 | 5 | 2.51 | ppm |
| Mg | 22 | 10 | 1.51 | ppm |
| Na | 4551 | 14 | 16.09 | ppm |
| Si | 120 | 128 | 6.54 | ppm |
| Total Impurities Al2O3 Basis | 5375 | 494 | 31.17 | ppm |

Example 2

Production of High Purity Aluminum Chloride Solution

The electrodialysis processing in Example 2 was carried out in a Eurodia EUR6B-20 electrodialysis stack. The stack consisted of a DSE anode and cathode and a combination of Neosepta AHA anion and Neosepta CMB cation permeable membranes. There were 20 electrodialysis membrane pairs each with an operating surface area of 0.056 m$^2$. Other cation and anion exchange membranes, including fluorinated membranes, can be used for the electrodialysis processes.

The feed tank was a 75 liter polypropylene tank and an Iwaki centrifugal pump was used to circulate the feed solution to the electrodialysis stack. Inlet pressure, flow rate, and temperature, were monitored during the run. The receiving tank was a 75 liter polypropylene tank and an Iwaki centrifugal pump was used to circulate the feed solution to the electrodialysis stack. The inlet pressure, flow rate, pH and temperature of this solution were also monitored during the run. The electrode rinse system consisted of two 20 liter polypropylene tanks for the anolyte and catholyte solution, each with an Iwaki centrifugal circulating pump. DC Power was supplied to the stack by a Sorensen DCS40-25 power supply. Current and voltage data was collected during the processing.

The system may be operated in batch mode or in a continuous mode whereby Al-salt feed solution is continuously added to the system and continuously removed and the receive solution is continuously added and continuously removed. The system may be operated in semi-batch mode or any combination of batch and continuous modes.

60,000 grams of a polyaluminum chloride salt solution produced from the reaction of aluminum trihydrate, hydrochloric acid and water with an analysis shown as PAC Solution in Table 2 was placed in the feed solution tank. 55,000 grams of hydrochloric acid solution with a conductivity of 150 mS/cm$^2$ was placed into the receiving solution tank. Hydrochloric acid solution with a conductivity of 150 ms/cm$^2$ was placed into the catholyte solution tank and sulfuric acid solution with conductivity of 150 ms/cm$^2$ was placed into the anolyte solution tank. The four solutions were circulated by means of centrifugal pumps through the respective compartments of the electrodialysis stack and returned to the respective tanks. The solutions were heated to 40° C. by means of electric immersion heaters and the temperature was maintained at 40° C. during operation. DC power at 25 amps and 20 V was applied. A total of 80 amp hours charge was passed. The DC power and circulation pumps were shut off, the feed solution analyzed and the analysis reported as HP-PAC Solution in Table 2. The analyses of all solutions and high purity alumina were performed using ICP-OES.

The Al-salt described in this example is for example only. Other Al chloride salts can be used including any of those described by the formula $Al_2(OH)_xCl6_{-x}$.

TABLE 2

Analysis of Aluminum Salt solutions and High Purity alumina. Trace elements reported on a 100% Al2O3 basis.

| Description | PAC Solution | HP PAC Solution | HP AlCl3 Solution | HP AlCl3*6H2O | HP AlCl3*6H2O Rinsed | HPA | HPA Rinsed | HPA from HP PAC | Units |
|---|---|---|---|---|---|---|---|---|---|
| $Al_2O_3$ | 8.94% | 8.70% | 6.75% | 20.62% | 20.48% | 99.988 | 99.994 | 99.975 | wt/wt % |
| Cl | 11.74% | 7.84% | 14.18% | ND | ND | ND | ND | ND | wt/wt % |
| Ca | 280 | 33 | 34 | 5.8 | 1.0 | 9.3 | 3.9 | 18.7 | ppm |
| Cr | <1.1 | <1.1 | <0.7 | <0.5 | <0.5 | 0.8 | <0.5 | <0.5 | ppm |
| Cu | <1.1 | <1.1 | <0.7 | <0.5 | <0.5 | 10.3 | 10.4 | 6.4 | ppm |
| Fe | 46 | 47 | 50 | 5.8 | 1.0 | 46.2 | 19.5 | 61 | ppm |
| Ga | 58 | 60 | 58 | 5.8 | <5.4 | 8.5 | 2.5 | 9.9 | ppm |
| Mg | 32 | 13.8 | 14.8 | 1.0 | <0.2 | 2.6 | 0.6 | 9.8 | ppm |
| Na | 4027 | 24 | 16.3 | <10.7 | <10.7 | 9.1 | 4.0 | 16.4 | ppm |
| Ni | <1.1 | <1.1 | <1.5 | <1.0 | <1.0 | 8.8 | 3.4 | 4.4 | ppm |
| Si | 92 | 105 | 102 | 8.7 | <5.4 | 16.9 | 8.6 | 121 | ppm |
| Ti | <1.1 | <1.1 | <1.5 | <1.0 | <1.0 | <0.5 | <0.5 | 1.1 | ppm |
| Zn | 96 | 1.1 | <0.7 | <0.5 | <0.5 | 1.1 | 6.2 | 0.4 | ppm |
| Zr | 1.1 | 1.1 | 1.5 | <0.5 | <0.5 | <0.5 | <0.5 | <0.5 | ppm |
| Ag | <1.1 | <1.1 | <1.5 | <1.0 | <1.0 | <0.5 | <0.5 | <0.5 | ppm |
| As | <6.7 | <5.7 | <5.9 | <5.3 | <5.4 | <2.6 | <2.6 | <2.6 | ppm |
| Ba | <1.1 | <0.6 | <0.7 | <0.5 | <0.5 | 0.4 | 0.4 | <0.5 | ppm |
| Be | 5.6 | 5.7 | 5.9 | <1.0 | <0.2 | 0.8 | <0.5 | <0.5 | ppm |
| Bi | <6.7 | <5.7 | <5.9 | <5.3 | <5.4 | <2.6 | <2.6 | <2.6 | ppm |
| Cd | <1.1 | <1.1 | <0.7 | <0.5 | <0.5 | <0.5 | <0.5 | <0.5 | ppm |
| Co | <1.1 | <1.1 | <1.5 | <1.0 | <1.0 | <0.5 | <0.5 | <0.5 | ppm |
| Hg | <6.7 | <4.6 | <4.4 | <4.4 | <4.4 | <0.5 | <0.5 | <0.5 | ppm |
| K | 10.1 | <5.7 | <5.9 | <5.3 | <5.4 | 0.8 | 0.6 | 0.3 | ppm |
| Li | 12.3 | <5.7 | <5.9 | <5.3 | <5.4 | <2.6 | <2.6 | <0.5 | ppm |
| Mn | 5.6 | <1.1 | <0.7 | <0.5 | <0.5 | <0.5 | <0.5 | <0.5 | ppm |
| Mo | <1.1 | <1.1 | <1.5 | <1.0 | <1.0 | 1.1 | <0.5 | <0.5 | ppm |
| P | <6.7 | <5.7 | <5.9 | <5.3 | <5.4 | <2.6 | <2.6 | 4.0 | ppm |
| Pb | <3.4 | <3.4 | <3.0 | <2.4 | <2.4 | <2.6 | <2.6 | <0.5 | ppm |
| S | 34 | 57 | 58 | 4.8 | 1.5 | ND | ND | ND | ppm |
| Sb | <6.7 | <5.7 | <5.9 | <5.3 | <5.4 | <5.2 | <5.2 | <2.6 | ppm |
| Se | <6.7 | <5.7 | <5.9 | <5.3 | <5.4 | <2.6 | <2.6 | <2.6 | ppm |
| Sn | <6.7 | <5.7 | <5.9 | <5.3 | <5.4 | <2.6 | <2.6 | <2.6 | ppm |
| Tl | <1.1 | <0.6 | <0.7 | <0.5 | <0.5 | <2.6 | <2.6 | <2.6 | ppm |
| V | 1.1 | 1.1 | 1.5 | <1.0 | <1.0 | <0.5 | <0.5 | 0.8 | ppm |

Example 3

Production of High Purity Aluminum Sulfate Solution

Description of the electrodialysis stack used: Euro 2 electrodialysis stack system supplied by Eurodia Industrie with 10 active cells pairs of Astom Neosepta AHA and CMB, with dilute sulfuric acid electrode rinse solution.

3000 grams of an Aluminum Sulfate Solution with analysis shown in Table 3 below was placed in the feed solution tank. 7900 grams of the same solution was placed into the receiving solution tank. The solutions were circulated through the ED stack and returned to the tanks. DC power was applied at 17 volts and 5 amps. A total of 10 amp hours was applied. The DC power and circulation pumps were shut off, the feed solution analyzed, and the analysis reported as HP-Aluminum Sulfate Solution in Table 3. The analyses of all solutions were performed using ICP-OES.

TABLE 3

| Description | Aluminum Sulfate Solution | HP - Aluminum Sulfate Solution | UNITS |
|---|---|---|---|
| $Al_2O_3$ | 6.06 | 5.98 | wt/wt % |
| Ag | <0.1 | <0.1 | ppm |
| As | <0.3 | <0.3 | ppm |
| Ba | 0.1 | 0.1 | ppm |
| Be | <0.05 | <0.05 | ppm |
| Bi | <0.3 | <0.3 | ppm |
| Ca | 21 | 13.8 | ppm |
| Cd | <0.05 | <0.05 | ppm |
| Cl⁻ | 0.2 | 0.02 | wt/wt % |
| Co | <0.1 | <0.1 | ppm |
| Cr | 0.1 | 0.1 | ppm |
| Cu | 0.2 | 0.1 | ppm |
| Fe | 15.2 | 15.6 | ppm |
| Ga | 4.5 | 4.7 | ppm |
| Hg | <0.3 | <0.3 | ppm |
| K | 4.4 | 0.4 | ppm |
| Mg | 2.2 | 1.8 | ppm |
| Mn | 0.1 | 0.1 | ppm |
| Mo | 0.1 | 0.1 | ppm |
| Na | 200 | 42 | ppm |
| Ni | 0.2 | 0.2 | ppm |
| P | <0.3 | <0.3 | ppm |
| Pb | <0.2 | <0.2 | ppm |
| Sb | <0.3 | <0.3 | ppm |
| Se | <0.3 | <0.3 | ppm |
| Si | 5.7 | 5.5 | ppm |
| Sn | <0.3 | <0.3 | ppm |
| Ti | 1.5 | 1.7 | ppm |
| Tl | <0.05 | <0.05 | ppm |
| V | 0.3 | 0.3 | ppm |
| Zn | 1.8 | 3.7 | ppm |
| Zr | 30 | 33 | ppm |

Example 4

Production of High Purity Alumina from HP PAC Solution

A sample of HP PAC Solution produced by the method described in Example 2 was heated to dryness in an oven. The dry polyaluminum chloride was then placed in a muffle furnace and the furnace heated to 1050° C. The sample was held at that temperature for 1 hour then cooled. The analysis of the High Purity Alumina so produced is shown as HPA from HP PAC in Table 2.

Example 5

Production of High Purity Alumina from Aluminum Chloride Hexahydrate Crystallization HP-PAC solution produced by the method described in Example 2 was converted to aluminum chloride solution by addition of hydrochloric acid. The analysis of the resulting aluminum chloride solution is shown as HP $AlCl_3$ Solution in Table 2. 190 pounds of the HP $AlCl_3$ solution was placed into a glass lined, agitated, jacketed vessel. Steam was applied to the jacket of the vessel with the agitator running and the solution was heated to boiling. Water was evaporated from the solution with concurrent addition of HP $AlCl_3$ Solution to maintain constant weight. The solution was concentrated in this manner until an approximately 31.5% $AlCl_3$ solution concentration was obtained. At this point crystals begin forming and the process was continued until an approximately 25% $AlCl_3 \cdot 6H_2O$ crystal slurry in mother liquor concentration was obtained. Approximately 40 lbs of the slurry was removed from the vessel, the crystals were separated from the mother liquor by centrifugation and the mother liquor was returned to the vessel. HP $AlCl_3$ Solution was added to the vessel to maintain 190 pounds of $AlCl_3 \cdot 6H_2O$/mother liquor slurry in the vessel. The process was repeated in this manner to operate the crystallizer in a semi-continuous mode. The crystals separated from the mother liquor were analyzed and the result is shown as HP $AlCl_3 \cdot 6H_2O$ in Table 2.

A portion of the $AlCl_3 \cdot 6H_2O$ crystals was rinsed with saturated HP $AlCl_3$ solution made by dissolving HP $AlCl_3 \cdot 6H_2O$ crystals in deionized water to remove mother liquor and impurities adhered to the surface of the HP $AlCl_3 \cdot 6H_2O$. The weight ratio of rinse solution to crystal was 0.25:1. The rinse solution was separated from the HP $AlCl_3 \cdot 6H_2O$ crystals by centrifugation. The rinsed HP $AlCl_3 \cdot 6H_2O$ crystals were analyzed by ICP-OES and the results reported as HP $AlCl_3 \cdot 6H_2O$ Rinsed in Table 2.

A portion of the HP $AlCl_3 \cdot 6H_2O$ crystals was calcined in a muffle furnace at 1050° C. for 1 hour to decompose the HP $AlCl_3 \cdot 6H_2O$ and produce High Purity Alumina. The High Purity Alumina so produced was analyzed by ICP-OES. The analysis of the High Purity Alumina is reported as HPA in Table 2.

A portion of the HP $AlCl_3 \cdot 6H_2O$ Rinsed crystals was calcined in a muffle furnace at 1050° C. for 1 hour to decompose the HP $AlCl_3 \cdot 6H_2O$, rinsed to produce High Purity Alumina. The High Purity Alumina so produced was analyzed by ICP-OES. The analysis of the High Purity Alumina is reported as HPA Rinsed in Table 2.

Although the present invention has been described with reference to preferred embodiments, persons skilled in the art will recognize that changes may be made in form and detail without departing from the spirit and scope of the invention. All references cited throughout the specification, including those in the background, are incorporated herein in their entirety. Those skilled in the art will recognize, or be able to ascertain, using no more than routine experimentation, many equivalents to specific embodiments of the invention described specifically herein. Such equivalents are intended to be encompassed in the scope of the following claims.

What is claimed is:

1. A method for the production of aluminum oxide comprising the steps:
   providing an aluminum salt in an initial aluminum salt solution;
   subjecting the initial aqueous aluminum salt solution to electrodialysis to remove non-aluminum monovalent and/or multivalent cations from the initial aqueous aluminum salt solution, wherein a purified aqueous aluminum salt solution is produced with a reduction of non-aluminum monovalent and/or multivalent cations from the initial aqueous aluminum salt solution; and
   subjecting the purified aluminum salt solution to heating to provide aluminum oxide.

2. The method of claim 1, wherein the non-aluminum monovalent and/or multivalent cations of the initial aqueous aluminum salt solution comprise Na, K, Li, Ca, Cr, Zn, Cu, Ti, Mg, Mn, Ba, Sr, V, Ni, Pb, Co, Sb, As, B, Sn, Be, Mo, Fe, Si or other cations or mixtures thereof.

3. The method of claim 1, wherein the aluminum salt of the initial aqueous aluminum salt solution comprises aluminum chloride, aluminum sulfate, aluminum ammonium sulfate, aluminum nitrate, aluminum citrate, 1-hexanol aluminum, polyaluminum chloride (PAC), aluminum chlorohydrate (ACH), aluminum acetate, aluminum choline solution or mixtures thereof.

4. The method of claim 1, wherein the purified aqueous aluminum salt solution comprises less than about 1000 ppm on an aluminum oxide basis, in total, of non-aluminum monovalent and/or multivalent cations.

5. The method of claim 1, wherein a purified aluminum salt is separated from the purified aqueous aluminum salt solution.

6. The method of claim 5, wherein the purified aluminum salt is treated with an aluminum salt solution or other solution.

7. The method of claim 6, wherein the purified aluminum salt is washed with the aluminum salt solution or other solution.

8. The method of claim 5, wherein separation of the purified aluminum salt from the purified aqueous aluminum salt solution is by evaporation, crystallization or by addition of hydrochloric acid, nitric acid, sulfuric acid or mixtures thereof.

9. The method of claim 1, wherein heating is performed by roasting, spray roasting, calcining, or an oil drop process.

10. The method of claim 1, wherein heating is from about 500° C. to about 1300° C.

11. A method for the removal of non-aluminum monovalent and/or multivalent metal cations from an aqueous aluminum salt solution to provide aluminum oxide comprising the steps:
    providing an aluminum salt in an initial aluminum salt solution;
    subjecting the initial aqueous aluminum salt solution to electrodialysis to remove non-aluminum monovalent and/or multivalent cations from the initial aqueous aluminum salt solution, wherein a purified aqueous aluminum salt solution is produced with a reduction of non-aluminum monovalent and/or multivalent cations from the initial aqueous aluminum salt solution; and subjecting the purified aluminum salt solution to heating to provide the aluminum oxide.

12. The method of claim 11, wherein the non-aluminum monovalent and/or multivalent cations of the initial aqueous aluminum salt solution comprise Na, K, Li, Ca, Cr, Zn, Cu, Ti, Mg, Mn, Ba, Sr, V, Ni, Pb, Co, Sb, As, B, Sn, Be, Mo, Fe, Si or other cations or mixtures thereof.

13. The method of claim 11, wherein the aluminum salt of the initial aqueous aluminum salt solution comprises aluminum chloride, aluminum sulfate, aluminum ammonium sulfate, aluminum nitrate, aluminum citrate, 1-hexanol aluminum, polyaluminum chloride (PAC), aluminum chlorohydrate (ACH), aluminum acetate, aluminum choline solution or mixtures thereof.

14. The method of claim 11, wherein the purified aqueous aluminum salt solution comprises less than about 1000 ppm on an aluminum oxide basis, in total, of non-aluminum monovalent and/or multivalent cations.

15. The method of claim 11, wherein a purified aluminum salt is separated from the purified aqueous aluminum salt solution.

16. The method of claim 15, wherein the purified aluminum salt is treated with an aluminum chloride solution or other solution.

17. The method of claim 16, wherein the purified aluminum salt is washed with the aluminum chloride solution or other solution.

18. The method of claim 15, wherein separation of the purified aluminum salt from the purified aqueous aluminum salt solution is by evaporation, crystallization or by addition of hydrochloric acid, nitric acid, sulfuric acid or mixtures thereof.

19. The method of claim 11, wherein heating is performed by roasting, spray roasting, calcining, or an oil drop process.

20. The method of claim 11, wherein heating is from about 500° C. to about 1300° C.

* * * * *